INVENTOR.
LELAND O. McLEAN
BY
HIS ATTORNEY.

Patented June 20, 1950

2,512,360

UNITED STATES PATENT OFFICE 2,512,360

PNEUMATIC CLUTCH MECHANISM

Leland O. McLean, Marion, Ohio

Application September 22, 1948, Serial No. 50,649

4 Claims. (Cl. 192—85)

1

My invention consists in certain new and useful improvements in clutch mechanism for the transmission of rotary movement, as from a driving shaft to a shaft to be driven.

Among the objects which I have in view are the following.

A durable and efficient clutch structure composed of a minimum of operating parts, which may be quickly and conveniently repaired and new parts substituted, when necessary, without disassembling the clutch.

A clutch mechanism, operated by compressed air, which is more rapid in operation in engaging and releasing the clutch and which will not overheat or become fouled with dust or dirt.

To accomplish these and other objects I provide a new and improved structure wherein the housing is mounted rigidly in relation to one of the shafts which are to be connected for rotation in unison. In the embodiment of the principles of the present invention illustrated in the accompanying drawings the clutch housing is carried by and rotates with the driving shaft while the shaft to be driven is journaled in the opposite end of the housing in alignment with the driving shaft, but the relative positions and arrangement of the two shafts may be reversed without departing from the novel principles of the invention.

The housing is preferably rotatively mounted in a bracket or support and composed of two spaced end plates or members held in fixed relation by a wall which preferably is segmental, thereby enclosing the housing for only a portion of its perimetral extent. Thus the cooling of the interior mechanism of the clutch is facilitated and overheating or the accumulation of dust or dirt prevented. To aid in effecting these advantages I provide means whereby when the expansion chamber is deflated the compressed air escaping from the chamber flows through a port which directs the current of air in contact with the complementary frictional members which are engaged in surface contact when the clutch is in operation. This current of air escapes from the housing through the open space in the sides thereof and carries with it all dust and dirt which may accumulate within the housing.

I provide means whereby the escape port of the expansion chamber is automatically stopped as the compressed air is first admitted to the inlet valve mechanism of the expansion chamber, thus sealing the expansion chamber, and then as the pressure of the air admitted to the valve mechanism increases to a predetermined point

2 the valve mechanism opens to admit full pressure to the chamber. When the pressure is first reduced in the inlet valve mechanism of the chamber by manipulation of the master valve, the escape port of the chamber is automatically opened by the excess pressure in the chamber over the pressure in the inlet valve mechanism, allowing the chamber to contract under the influence of the biased friction member which was previously moved into its frictional engagement by the expansion of the chamber.

Other novel and important features and arrangement of parts will appear in the following description.

In the accompanying drawings wherein is illustrated a practical embodiment of the principles of the invention, Fig. 1 is a longitudinal section on enlarged scale of the clutch mechanism taken along the angular line 1—1 in Fig. 2;

Figure 1:
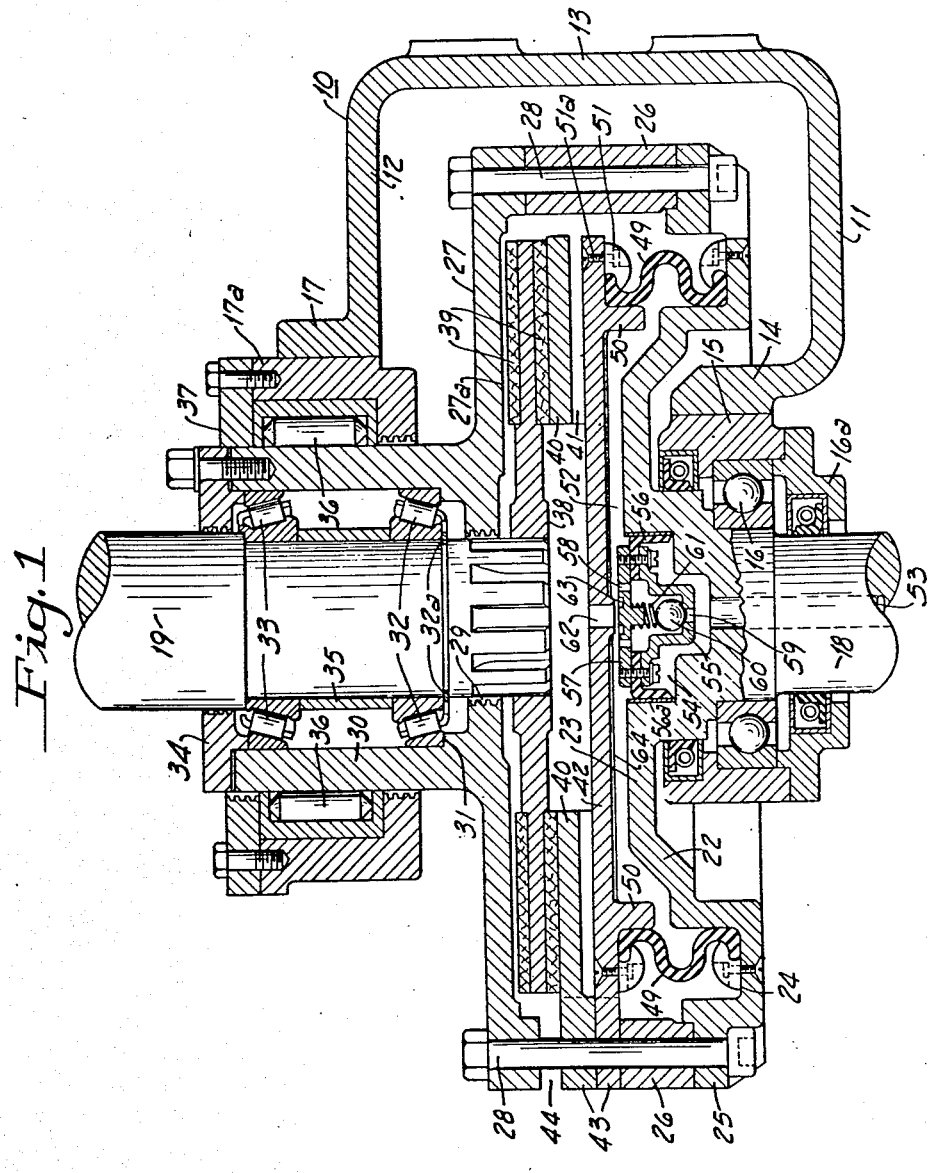

Referring to the drawings, 10 indicates the mounting bracket of the clutch structure, which is preferably formed integrally, as by casting, and is, when the clutch is installed, mounted on a fixed support. The bracket comprises two parallel end walls, 11 and 12, of segmental shape, less than a semicircle, and connected at their outer perimetral edges by an arcuate side wall 13.

The inner perimetral edge of the end wall 11 is defined by an arcuate concentric flange 14 which fixedly supports the tubular bearing box 15 wherein is mounted the antifriction bearing 16. 16a is a keeper ring bolted on the box 15.

The inner perimetral edge of the end plate 12 is likewise provided with an arcuate flange 17 which fixedly supports the tubular bearing box 17a.

18 indicates the driving shaft which is operatively connected to the Diesel engine or other source of rotary power, and 19 indicates the driven shaft which is to be driven through the pneumatic clutch.

The end of the driving shaft 18 is journaled in the antifriction bearing 16, the latter being held in position in the box 15 as by means of the keeper ring 16a which may be bolted to the end of the box.

22 indicates one of the circular end plates of the driving housing, which plate is mounted on and may be, as shown, integral with the driving shaft 18. The plate 22 preferably comprises a flat circular inner portion 23 and adjacent its perimetral edge a sunken trough 24 defined at its outer edge by the step flange 25.

26 indicates the ring or annular wall which forms the perimetral wall of the driving housing and which is stepped in the flange 25 of the plate 22.

27 indicates the other circular end plate of the driving housing which has a perimetral flange which rests on the edge of the wall 26. The plate 27 is provided with an annular flat surface 27a for frictional contact use, as is later explained. 28 indicates stay bolts extending through registering holes in the end plates 22 and 27 and in the ring 26 to assemble the parts in fixed relation.

The end plate 27 is provided with an axial opening 29 through which the reduced end of the driven shaft 19 extends, and 30 indicates a tubular axially disposed neck which extends outwardly from the plate 27 and of somewhat greater interior diameter than that of the opening 29. The bore of the neck 30 is reduced adjacent its inner end to form a supporting shoulder 31 against which the outer race of the antifriction bearing 32 bears. The shaft 19 is provided with a circumferential groove to receive the split ring 32a to support the inner race of the bearing 32. A second antifriction bearing 33 is mounted in the bore of the neck near its outlet end and is held against outward displacement by an inwardly extending annular rib on the annular cap 34 which is secured as by cap screws to the end of the neck. The reduced end portion of the shaft 19 is rotatably supported in the bearings 32 and 33 which are held spaced apart by the sleeve 35 which surrounds the shaft.

The neck 30 of the plate 27 is journaled in the tubular box 17a by the roller bearing 36 held in place by the annular collar 37, which is held in place on the neck by cap screws.

38 indicates a metal disk which is keyed on the inner end of the driven shaft 19 within the housing to rotate with the shaft but slidable on the latter. Both faces of the disk, adjacent its perimeter, are provided with rings 39 formed of frictional lining material, riveted to the disk, to avoid wear between metal surfaces.

Figure 2:
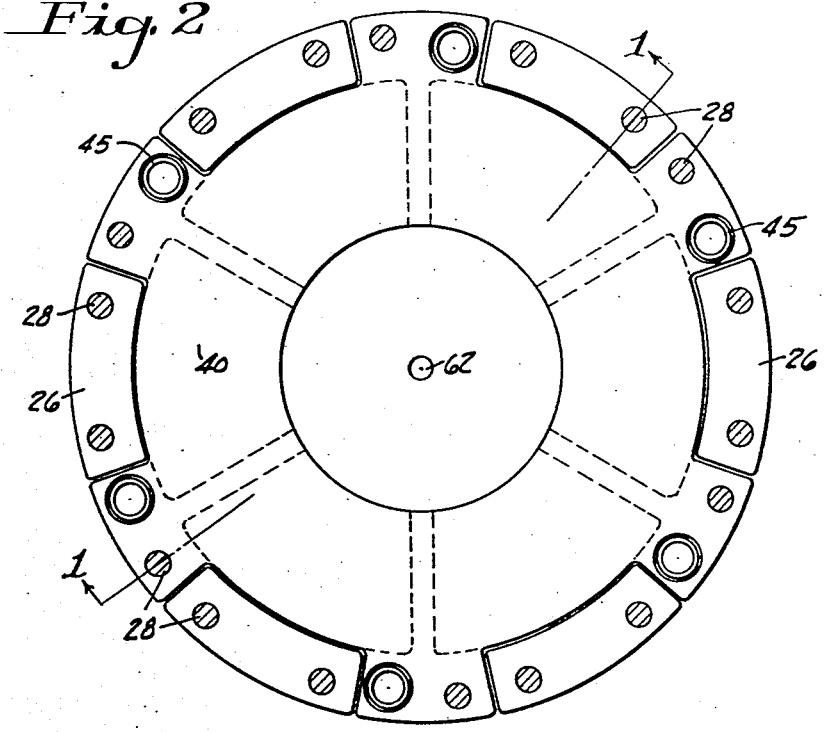
Fig. 2 is a top plan view showing the annular wall of the clutch housing with the driving ring assembled therewith, the latter being superimposed on the driving member.
Figure 4:
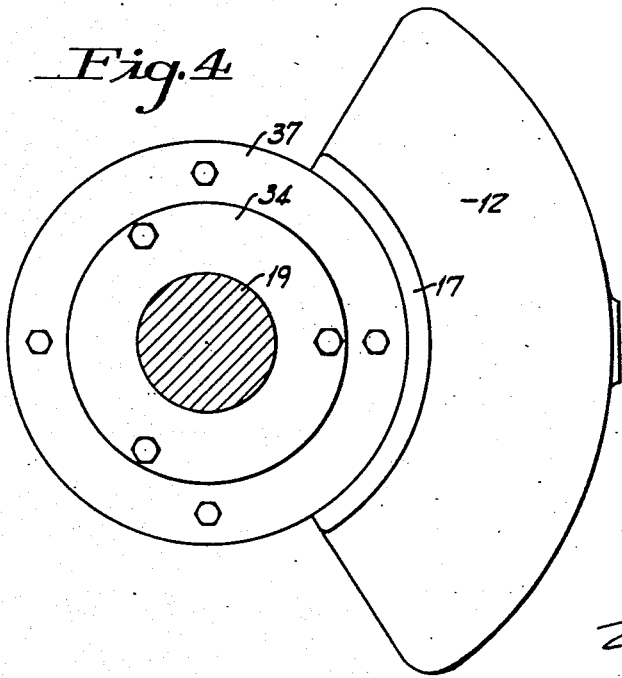
Fig. 4 is a top plan view of the mounting bracket with the clutch parts removed.
Figure 3:
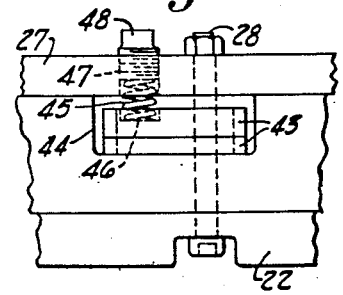
Fig. 3 is a partial edge view on enlarged scale looking from the left in Fig. 2.

40 indicates the annular metal driving ring arranged to be brought into surface contact with the inner face of the disk 38 by axial movement of the ring. The face of the ring away from the disk is provided with a plurality of circumferentially arranged series of radial slots or grooves 41 for the free escape of air from the clutch. Both the driving ring 40 and the driving member 42 are of the perimetral contour shown in Fig. 2, being generally of less diameter than the end plates 27 and 22 but being provided with spaced radial tongues 43 which extend outwardly through corresponding openings or ports 44 in the perimetral wall 26 of the housing, the said ports being of materially greater depth than the combined thickness of the ring and the member to permit axial movement of the same. Certain of the stay bolts 28 extend through registering holes in the tongues 43 of the ring and member, thus enabling the ring and member to slide axially of the housing. To normally retain the ring 40 out of engagement with the disk 38, coiled springs 45 are interspersed between the ring 40 and the end plate 27. The springs are stepped at their inner ends in seats 46 cut in the tongues 43 of the ring 40, and extend up into holes 47 through the plate 27, the upper ends of the holes being threaded to receive cap nuts 48 which bear down on the springs to compress the same, the adjustment of the nuts regulating the resilient force of the springs.

49 indicates an annular diaphragm formed of a rubber or like material having one perimetral edge portion clamped to the rear face of the driving member 42 and against an annular flange 50 on the face of the latter by means of a sealing ring 51 and screws 51a. In like manner the opposite perimetral edge portion of the ring is held in sealed relation in the trough 24. Thus an expansible pneumatic chamber 52 is provided between the driving member and the end plate 22 of the housing.

53 indicates a passage extending longitudinally of the driving shaft 18 for the admission of compressed air into the chamber 52 to expand the latter, the exhaustion of pressure from the chamber to permit the springs 45 to release the clutch, or to block the passage 53 thus preventing the escape of pressure through the passage from the expanded chamber.

The supply of air through the passage 53 is controlled by the usual master valve, not shown, having provision for admitting compressed air under variable pressure, for evacuating pressure and for sealing the passage.

54 indicates a cylindrical chamber of differential diameter formed in the axial center of the end plate 22. The passage 53 connects with the inner portion of the chamber 54, which latter is of greater diameter than the passage. The outer portion of the chamber 54, that opening into the pressure chamber 52, is of greater diameter than the inner portion of the chamber 54.

Mounted for axial movement in the chamber 54 is a valve cage 55 which also is of differential diameter to loosely fit the chamber 52.

56 indicates an annular cup-like piston, preferably of leather or a somewhat elastic rubber composition, the skirt of which is arranged to reciprocate in a cylinder formed of a smooth walled sleeve 56a which is press-fitted in the portion of the chamber 54 of the larger diameter, and which may be replaced when worn.

The piston 56 is secured to the valve cage 55 by means of the annular inwardly extending lip of the piston which is clamped to the inner face of the cage by means of the face plate 57 which is bolted to the cage which is thus floatably supported in the chamber.

The plate 57 is provided with a concentric series of ports 58 for the admission of pressure into the expansion chamber 52 or the escape of pressure therefrom.

The inner or rear end of the cage is provided with a central port 59 for the admission of compressed air into the interior of the cage, which port is resiliently closed by a ball valve 60 biased into closed position by the spring 61. When the control valve, not shown, is opened to admit pressure through the passage 53 and the pressure at which the air is supplied is sufficient to overcome the power of the spring 61, the ball valve 60 is forced from its seat and the pressure is admitted to the chamber 52 through the interior of the cage and the ports 58.

The driving member 42, which forms the movable end wall of the pressure chamber 52, is provided with a central port 62 which provides a quick relief opening for the pressure chamber when the master control is shifted into position to shut off the introduction of pressure and relieve the pressure from the delivery end of the passage 53.

The port 62 is defined at its chamber end by an annular lip which, when the cage 55 is forced outwardly of the chamber 54, by the movement of the piston 56 in response to the pressure entering the chamber 54, is engaged by the annular gasket 63 seated in an annular seat in the face of the face plate 57, thus sealing the port 62 and preventing the escape of pressure from the chamber 52. When the pressure is released from behind the piston and cage, resulting in their movement inwardly in the chamber 54, the gasket is disengaged from the annular lip of the port 62, opening the port and allowing the pressure to be relieved by escaping through the driving member 42.

Thus there is provided a quick exhaustion of pressure from the expansion chamber, permitting the springs 45 to disengage the driving ring 40 from frictional contact with the disk 38 and releasing the clutch.

In place of the piston shown a diaphragm connecting the cage to the seat may be substituted.

The compression chamber face of the driving member 42 is provided with radial ribs 64 to prevent surface contact of the member with end plate 22 when the expansion chamber is collapsed, thus aiding in the initial admission of compressed air into the chamber to expand the same.

While the pressure might be exhausted from the expansion chamber by turning the master valve into position to relieve the pressure in the clutch end of the passage 53 this method of release would be much slower in action and the additional advantage of exhausting the air through the clutch mechanism and thus cooling the latter would be unattainable.

The initial compressed air admitted through the shaft passage 53 into the chamber 54 causes the cage 55 to move outwardly in said chamber, thus closing the escape port 62, and as the pressure of the admitted air increases the spring 61 is compressed, opening the port 59, thus admitting the pressure through the interior of the cage and the ports 58 into the expansion chamber 52 to operate the clutch.

The pressure is differentiated in favor of the chamber 54 by means of the pressure of the spring 61 on the ball 60, thus holding the port 59 closed until sufficient air pressure is released from the chamber 54 back through the master valve to permit the greater pressure in the expansion chamber to return the cage assembly to its retracted position in the chamber 54, thus opening the escape port to quickly relieve the air from the expansion chamber and thus release the clutch.

It is evident that the position of the driving shaft 18 and of the driven shaft 19 may be reversed without departing from the scope of my invention. Thus the end portion of the driving shaft may be journaled in the tubular neck 30 of the end plate 27 of the clutch assembly and may have mounted thereon the disk 38, while the end portion of the driven shaft 19 may be journaled in the bearing box 15 and have the end plate 22 integrally mounted on its inner end. In such case the driven shaft would be provided with the longitudinal passage 53 and the chamber 54 and cage 55.

When the pressure chamber is fully expanded the driving ring 40 is moved into frictional engagement with the disk 38 which in turn is moved toward and into frictional engagement with the end plate 27 of the housing which rotates in unison with the driving ring.

Among the many and obvious advantages of my improved structure are the following: the provision of a maximum pressure area of the expansion chamber walls, the sole flexible portion of which consists of the flexible bellows-like annular wall of the chamber; the exhaust of the compressed air from the expansion chamber into the frictional contact area of the clutch, such exhausted air being cooler than the atmospheric temperature of such area, thus effectively cooling the latter and blowing dust or dirt therefrom; the accessibility for servicing the clutch members and disassembling the latter without disturbing the shaft mountings; the ability to reverse the mountings of the driving shaft and driven shaft relative to the clutch as may be found necessary or convenient, and the rotatively mounting of the clutch housing in a stationary support or bracket.

I claim:

1. In a pneumatic clutch for operatively connecting a driving shaft to a driven shaft for imparting rotary movement to the latter, the combination of a housing arranged at one of its extremities to be rigidly connected to one of the shafts, means for journaling the end portion of the second shaft in the opposite extremity of the housing and in alignment with the first shaft, a friction disk mounted on the end of the second shaft to rotate therewith within the housing, a complementary friction member mounted in the housing and rotating therewith, said friction member being movable into and out of frictional engagement with the disk and being biased for movement away from the latter, an expansion chamber in the housing with the friction member forming the inner end wall thereof and the adjacent end wall of the housing forming the outer wall thereof, a port in the friction member for the escape of pressure from the expansion chamber to release the clutch, a valve chamber formed in the said end wall of the housing, means for admitting compressed air into the valve chamber, a valve cage floatingly supported in said valve chamber and arranged to be projected forwardly into the expansion chamber upon the admission of pressure into the valve chamber, means carried by the cage to close the escape port when the cage is forwardly projected, ports in the cage for the passage of pressure from the interior of the cage into the expansion chamber to expand the latter and engage the friction member with the disk, and a spring seated valve in the cage which opens as the pressure in the valve chamber builds up, thus allowing the pressure to pass from the valve chamber into the cage and thence to the expansion chamber to engage the clutch.

2. In a pneumatic clutch for operatively connecting a driving shaft to a driven shaft to impart rotary movement to the latter, the combination of a housing arranged to rotate in unison with one of the shafts, the second shaft having its end portion extending into and journaled in a wall of the housing in alignment with the first shaft, said second shaft having mounted on the inner end portion a friction disk rotating with said second shaft, a friction plate means movably mounted in the housing and rotating therewith and movable in alignment with the shafts into and out of engagement with the friction disk, said friction plate means being biased away from the disk, an expansion chamber in the housing which when expanded by the admission thereto of pressure shifts the friction plate member into frictional engagement with the friction disk thus engaging the clutch and causing the shaft to rotate in unison and the retraction of the expansion chamber allowing the friction plate means to move out of engagement with the disk and releasing the clutch, a valve chamber formed in the wall of the housing and provided with means for the admission of compressed air into the chamber, a valve cage floatingly mounted in the valve chamber and arranged to be projected inwardly of the expansion chamber when pressure is admitted to the valve chamber, ports in the cage for the admission of pressure from the interior of the cage into the expansion chamber to expand the same, a resiliently closed valve in the cage which as the pressure in the valve chamber increases opens to admit pressure from the valve chamber to the expansion chamber to expand the latter and engage the clutch, a pressure escape port for the expansion chamber to permit the latter to contract and release the clutch, and means controlled by the movement of the valve cage for closing the escape port when the compressed air is initially admitted to the valve chamber, said means being retracted to open the escape port when the supply of pressure is cut off from the valve chamber.

3. The combination of claim 2 characterized by the valve cage being floatingly supported in the valve chamber by the provision of an annular cup shape piston of flexible material, the inner annular perimetral portion being attached to the cage and its tubular skirt working in the cylindrical wall of the valve chamber.

4. In a pneumatic clutch for operatively connecting a driving shaft to a driven shaft for imparting rotary movement to the latter, the combination of a housing mounted on the end of one of the shafts to rotate therewith, means for journaling the end portion of the second shaft in the housing in alignment with the first shaft, a friction surface carried by the inner end of the second shaft and rotating therewith, a complementary friction member mounted in the housing to rotate therewith and movable in alignment with said friction surface, said member being biased away from the friction surface, an expansion chamber associated with said member and arranged when expanded to move said member into frictional engagement with said friction surface to cause the shafts to rotate in unison, an outlet port for the expansion chamber for the escape of pressure from the chamber to permit the friction member to move out of engagement with the friction surface and release the clutch, a valve chamber associated with the expansion chamber, means for supplying compressed air to the valve chamber, valve means in said chamber arranged when the pressure in said chamber attains a predetermined value to open and admit pressure to the expansion chamber and engage the clutch, and means for closing the escape port operative upon the initial admission of pressure into the valve chamber so that the expansion chamber may expand when the valve member operates to admit pressure to the expansion chamber.

LELAND O. McLEAN.

REFERENCES CITED

The following references are of record in the file of this patent:

UNITED STATES PATENTS

| Number | Name | Date |
|---|---|---|
| 1,805,081 | Drkal | May 12, 1931 |
| 2,087,380 | Kress | July 20, 1937 |
| 2,108,059 | Glasner | Feb. 15, 1938 |
| 2,120,798 | Criley | June 14, 1938 |
| 2,138,393 | Wichtendahl | Nov. 29, 1938 |
| 2,211,191 | Wolfram | Aug. 13, 1940 |

FOREIGN PATENTS

| Number | Country | Date |
|---|---|---|
| 642,953 | Germany | Jan. 11, 1936 |
| 829,074 | France | June 10, 1938 |